United States Patent
Lin

(10) Patent No.: US 9,705,981 B2
(45) Date of Patent: Jul. 11, 2017

(54) SENSING NETWORK SYSTEM, NODES AND DATA PROCESSING METHOD THEREOF

(71) Applicant: EGIS TECHNOLOGY INC., Taipei (TW)

(72) Inventor: Todd Lin, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 224 days.

(21) Appl. No.: 14/810,524

(22) Filed: Jul. 28, 2015

(65) Prior Publication Data

US 2016/0323370 A1 Nov. 3, 2016

(30) Foreign Application Priority Data

Apr. 30, 2015 (CN) .......................... 2015 1 0216867

(51) Int. Cl.
- *G06F 15/16* (2006.01)
- *H04L 29/08* (2006.01)
- *H04L 12/24* (2006.01)
- *H04W 4/00* (2009.01)

(52) U.S. Cl.
CPC ............ *H04L 67/104* (2013.01); *H04L 41/12* (2013.01); *H04L 67/12* (2013.01); *H04W 4/006* (2013.01)

(58) Field of Classification Search
USPC .................................. 709/223, 203, 204, 224
See application file for complete search history.

(56) References Cited

U.S. PATENT DOCUMENTS

| | | | |
|---|---|---|---|
| 7,769,848 B2 | 8/2010 | Choy et al. | |
| 8,102,759 B2 | 1/2012 | Wang et al. | |
| 8,391,260 B1 * | 3/2013 | Kopikare | H04W 8/005 370/338 |
| 8,880,585 B1 * | 11/2014 | Pope | H04L 67/104 709/203 |
| 2006/0176169 A1 * | 8/2006 | Doolin | G08B 17/00 340/521 |
| 2011/0055328 A1 * | 3/2011 | Lahr | H04L 67/104 709/204 |
| 2012/0109600 A1 * | 5/2012 | Saeed | G06F 17/10 703/2 |

* cited by examiner

*Primary Examiner* — Jude Jean Gilles
(74) *Attorney, Agent, or Firm* — Li & Cai Intellectial Property (USA) Office

(57) ABSTRACT

Disclosed are a sensing network system, and nodes and a data processing method thereof. The sensing network system comprises a plurality of nodes that are connected with each other. Each node has a sensing device and a storage device. The storage device of each node is divided into a first storage area and a second storage area. The first storage area stores data sensed by the sensing device of the node. The second storage area stores at least a part of the data sensed by the sensing device of at least one of other nodes. The node transmits at least a part of the data sensed by its sensing device to at least one of other nodes, in order to store at least a part of the data sensed by its sensing device in the second storage area in the storage device of at least one of other nodes.

16 Claims, 3 Drawing Sheets

SENSING NETWORK SYSTEM, NODES AND DATA PROCESSING METHOD THEREOF

BACKGROUND OF THE INVENTION

1. Field of the Invention

The instant disclosure relates to a sensing network system; in particular, to a sensing network system without a central server, and nodes and data processing method thereof, wherein the sensed data is stored in more than one node.

2. Description of Related Art

Currently, the sensing network system has been widely used in our daily life. For example, the home nursing service system, the monitoring system and the Internet of things are all sensing network systems. In the sensing network system, there are plenty of nodes set within a certain region, and these nodes are connected to a central server via the Internet. These nodes are, for instance, the photographing apparatus, the temperature sensing device, the electronic device with a positioning means or the like. The central server is, for instance, a cloud server that has or is linked with multiple cloud hard-disks. The data sensed by these nodes would be transmitted to the central server via the Internet so as to store the sensed data in the cloud hard-disks described above.

Please refer to FIG. 1. FIG. 1 shows a schematic diagram of a traditional sensing network system. The traditional sensing network system 1 comprises a plurality of nodes 101~105, the Internet 12 and a set of cloud servers and hard-disks 13. The plurality of nodes 101~105 are linked to the set of cloud servers and hard-disks 13 via the Internet 12. The set of cloud servers and hard-disks 13 has a plurality of cloud servers and a plurality of hard-disks and thus is considered as a central server.

Generally, if any of the nodes 101~105 fails or is stolen, the sensed data stored therein would also be lost. Thus, it is necessary to use the set of cloud servers and hard-disks 13 described above to store and back-up the data sensed by the nodes 101~105, which means that the traditional sensing network system 1 needs a plurality of cloud servers and a plurality of cloud hard-disks. As a result, a great cost is required for establishing the traditional sensing network system 1.

On the other hand, in the traditional sensing network system 1, the nodes 101~105 often need to upload the self-sensed data to the set of cloud servers and hard-disks 13, but seldom need to download data therefrom. Therefore, the amount of uploading data is much more than the amount of downloading data, which results in an asymmetrical transmission. This asymmetrical transmission would further make the download bandwidth usage rate of the traditional sensing network system 1 worse.

SUMMARY OF THE INVENTION

The instant disclosure provides a sensing network system, and the sensing network system comprises a plurality of nodes that are connected with each other, and each node has a sensing device and a storage device. The storage device of each node is divided into a first storage area and a second storage area. The first storage area stores data sensed by the sensing device of the node, and the second storage area stores at least a part of data sensed by the sensing device of at least one of other nodes. The node transmits at least a part of the data sensed by its sensing device to at least one of other nodes, in order to store at least a part of the data sensed by its sensing device in the second storage area in the storage device of at least one of other nodes.

The instant disclosure further provides a node in a sensing network system, and the node comprises a sensing device, a transmission device, a storage device and a processing device. The sensing device is configured to sense for obtaining data. The transmission device is configured to receive at least a part of the data sensed by the sensing device of at least one of other nodes. The storage device comprises a first storage area and a second storage area. The first storage area of the storage device is configured to store the data sensed by the sensing device of the node, and the second storage area of the storage device is configured to store at least a part of the data sensed by the sensing device of at least one of other nodes. The processing device is electrically connected to the sensing device, the transmission device and the storage device. The transmission device is further configured to transmit at least a part of the data sensed by the sensing device of the node to at least one of other nodes, so as to store at least a part of the data sensed by the sensing device of the node in the second storage area of the storage device of at least one of other nodes.

The instant disclosure further provides a data processing method used in each of a plurality of nodes connected with each other in a sensing network system, wherein each of the nodes has a sensing device and a storage device, and the storage device comprises a first storage area and a second storage area. The data processing method comprises: sensing to obtain data by the sensing device of the node; storing the data sensed by the sensing device of the node in the first storage area of the storage device of the node; receiving at least a part of the data sensed by the sensing device of at least one of other nodes in the sensing network system via the node; and storing at least a part of the data sensed by the sensing device of at least one of other nodes in the second storage area of the storage device of the node.

To sum up, the embodiment of the instant disclosure provides a sensing network system and a data processing method which have a better download bandwidth usage rate and less establishment cost.

For further understanding of the instant disclosure, reference is made to the following detailed description illustrating the embodiments of the instant disclosure. The description is only for illustrating the instant disclosure, not for limiting the scope of the claims.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Figure 1:
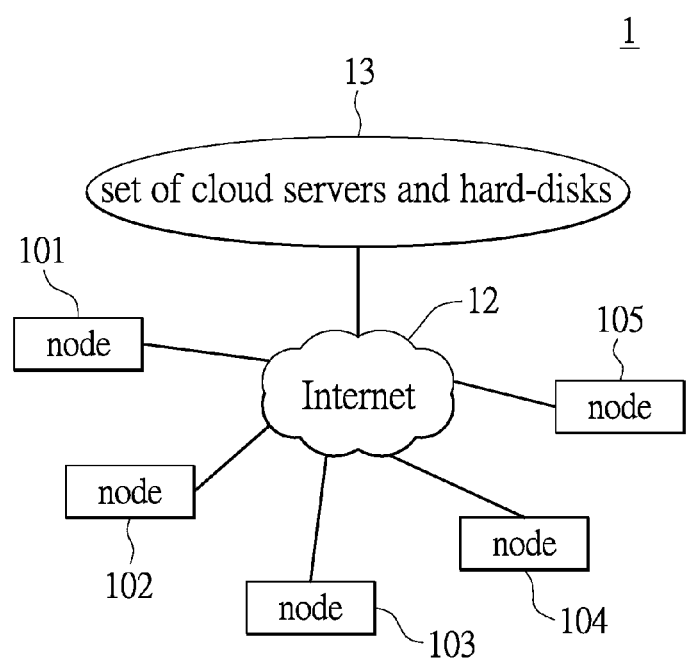
FIG. 1 shows a schematic diagram of a traditional sensing network system.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

The embodiment of the instant disclosure provides a sensing network system without a central server, wherein the nodes of the sensing network system are connected to each other. The storage device of each node could have a first storage area and a second storage area, wherein the first storage area stores the self-sensed data and the second storage area stores the data sensed by other nodes.

The nodes transmit the sensed data among them via a peer to peer (P2P) transmission, and the nodes would divide the self-sensed data into a plurality of data fragments and transmit part or all of the data fragments to one or several of other nodes for storing. Each node would store data sensed by other nodes, so if any of the nodes fails or is stolen, it is still able to obtain the data sensed by the failed or stolen node from other nodes. On the other hand, each node would store data sensed by other nodes, so the download bandwidth would be efficiently used, and there is no need to have a central server to store and manage the data sensed by each node. Comparing with the traditional sensing network system, the sensing network system according to the embodiment of the instant disclosure has a better download bandwidth usage rate and less establishment cost.

Selectively, the sensing network system according to the embodiment of the instant disclosure could apply the storage concept called big data to decrease the probability of occurrence of errors when the sensed data of the failed or stolen node is retrieved, which means that the sensing network system according to the embodiment of the instant disclosure can increase the fault tolerance of data retrieving. Assume that the sensing network system has N nodes and each node can use other M nodes to store its self-sensed data, wherein N is an integer greater than 2 and M is an integer greater than N/2. As any of the nodes fails or is stolen, the sensed data of the failed or stolen node can be retrieved by reading the stored data in other L nodes, wherein L is an integer greater than M/2.

Figure 2:
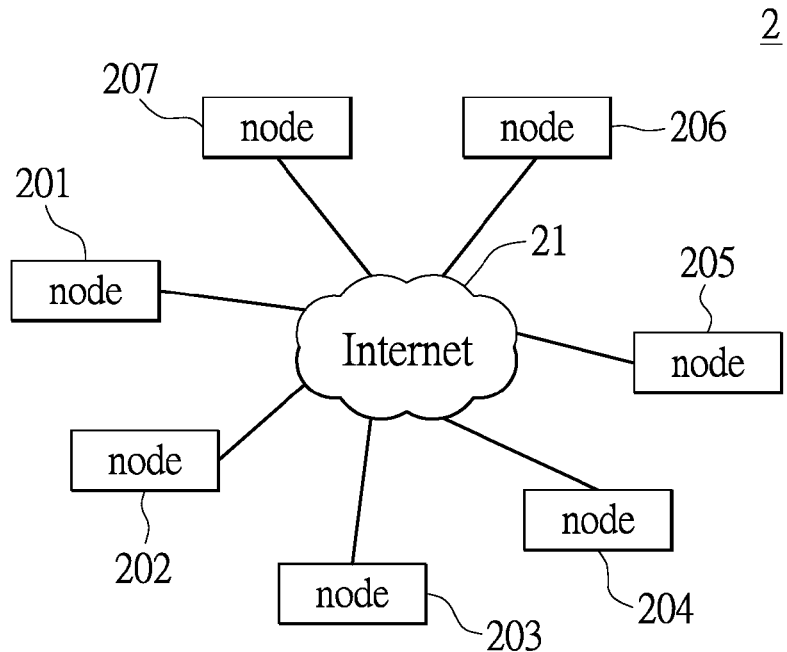
FIG. 2 shows a schematic diagram of a sensing network system without a central server according to one embodiment of the instant disclosure.

Please refer to FIG. 2. FIG. 2 shows a schematic diagram of a sensing network system without a central server of one embodiment of the instant disclosure. The sensing network system 2 without the central server comprises a plurality of nodes 201~207 and the Internet 21, wherein the nodes 201~207 are connected to each other via the Internet 21.

In this embodiment, the sensing network system 2 may be a home nursing service system, a monitoring system and the Internet of things. The sensing network system 2 may be different types of sensing network systems, and the nodes 201~207 may be such as a photographing apparatus, a temperature sensing device or an electronic device with a positioning means. The nodes 201~207 are linked with the Internet 21 in a wired way or a wireless way. Moreover, the nodes 201~207 can be connected to each other directly even without the Internet 21 in the sensing network system 2. Briefly, the types of the nodes 201~207 and the sensing network system 2 and the connection way, either wired or wireless, between nodes 201~207 may be varied and are not restricted to this embodiment.

In this embodiment, the nodes 201~207 transmit the sensed data there between via a peer to peer transmission. Take the node 201 for example, as the node 201 obtains the data sensed by its sensing device, the node 201 would store the data in the first storage area of its storage device. At the same time, the node 201 would divide the sensed data into a plurality of data fragments by its processing device, and transmit part or all of the data fragments by its transmission device to the second storage area of the storage device of at least one of the other nodes 202~207. Additionally, the way the nodes 202~207 process the sensed data can be the same as the way the node 201 processes its sensed data mentioned above, and thus the description is not repeated.

The sensing network system 2 provided by the embodiment of the instant disclosure can apply the storage concept called big data to increase the fault tolerance of data retrieving. For example, if the number of the nodes 201~207 is 7 (N=7), the data sensed by the node 202 would be divided into a plurality of data fragments and these data fragments would be transmitted to, for instance, another 4 nodes 204~207 (M=4>N/2). The second storage areas of the storage devices of the nodes 204~207 can store part or all of the data fragments sensed by the node 202. As the node 202 fails or is stolen, the sensing network system 2 can read the second storage areas of the storage devices of the other nodes, such as the nodes 205~207 (L=3>M/2), so as to retrieve and restore the data sensed by the node 202.

It should be noted that, if the need of increasing the fault tolerance of data retrieving is not to be taken into account, the sensing network system 2 can be designed not to apply the storage concept called big data. In this case, the sensing network system 2 could only use the second storage area of the storage device of at least one node, such as the node 203, to store the data sensed by the node 202. As the node 202 fails or is stolen, the sensing network system 2 reads only the second storage area of the storage device of the node 203 to retrieve and restore the data sensed by the node 202.

Figure 3:
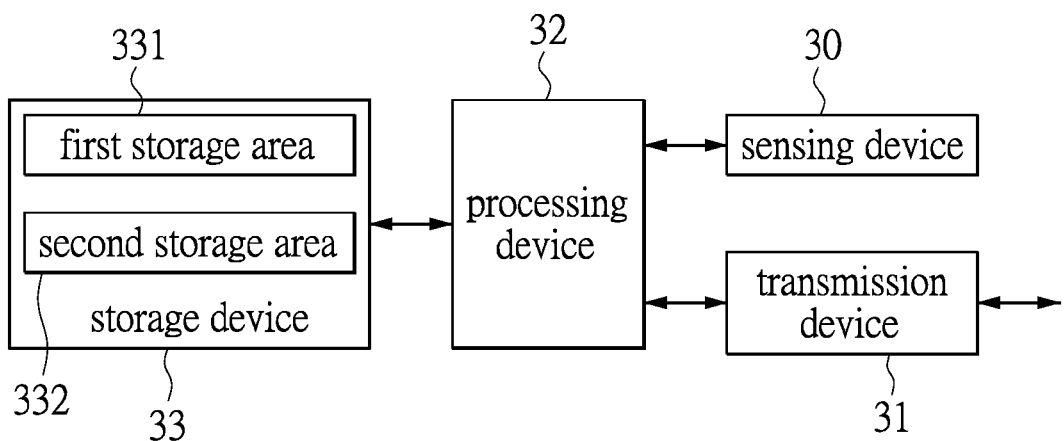
FIG. 3 shows a functional block diagram of a node according to one embodiment of the instant disclosure.

Please refer to FIG. 3. FIG. 3 shows a functional block diagram of a node of one embodiment of the instant disclosure. In this embodiment of the instant disclosure, the nodes 201~207 shown in FIG. 2 can be implemented by a node 3, but it is not limited herein. The node 3 comprises a sensing device 30, a transmission device 31, a processing device 32 and a storage device 33, wherein the processing device 32 is electrically connected to the sensing device 30, the transmission device 31 and the storage device 33.

In this embodiment, the sensing device 30 is controlled by the processing device 32 for sensing and then obtaining the sensed data. For example, the sensing device 30 may be a photographing apparatus, a temperature sensing device or an electronic device with a positioning means or the like, and it is not limited herein. The processing device 32 will store the data sensed by the sensing device 30 in the first storage area 331 of the storage device 33.

Moreover, the processing device 32 would divide the data sensed by the sensing device 30 into a plurality of data fragments and further control the transmission device 31 to transmit part or all of the data fragments to at least one of the other nodes, so as to store part or all of the data sensed by the sensing device 30 in at least one of other nodes. The processing device 32 also controls the transmission device 31 to receive a plurality of data fragments of the data sensed by the sensing device of at least one of other nodes. Then, the second storage area 322 of the storage device 33 is used to store the data sensed by the sensing device of at least one of other nodes.

Figure 4A:
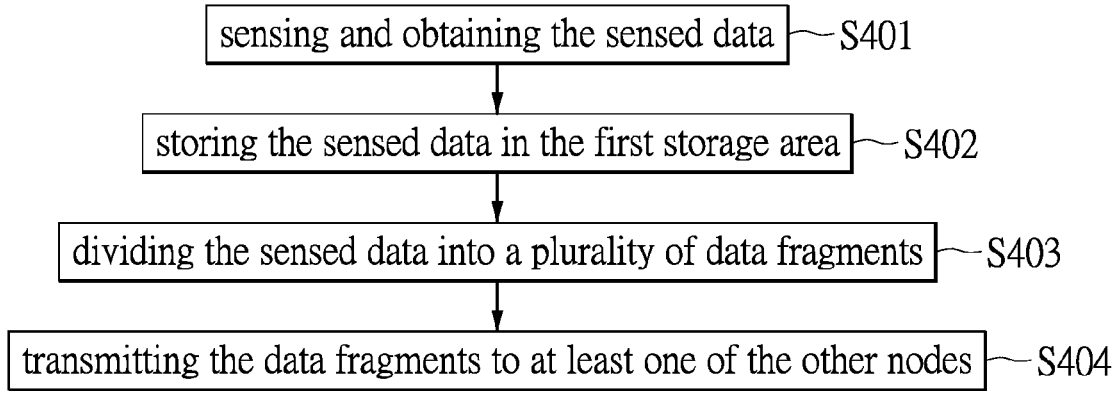
FIG. 4A shows a flow chart of a data processing method for a node to store and transmit data sensed by itself in one embodiment of the instant disclosure.
Figure 4B:
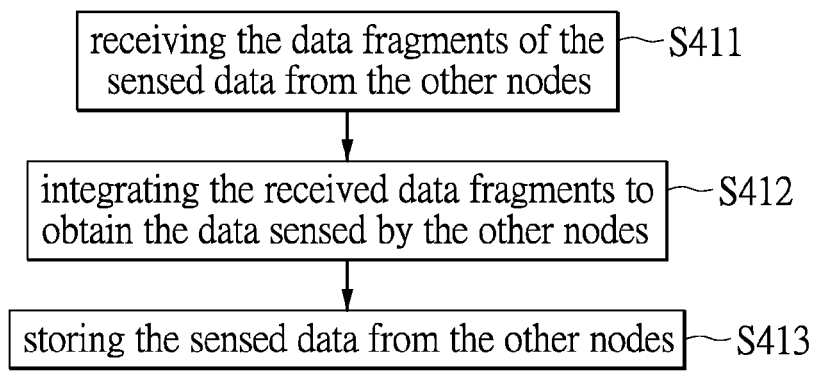
FIG. 4B shows a flow chart of a data processing method for a node to receive and store data sensed by other nodes in one embodiment of the instant disclosure.

Please refer to FIG. 4A and FIG. 4B. FIG. 4A shows a flow chart of a data processing method for a node to store and transmit data sensed by itself in one embodiment of the instant disclosure. FIG. 4B shows a flow chart of a data processing method for a node to receive and store data sensed by other nodes in one embodiment of the instant disclosure. In this embodiment, each node in the sensing network system would implement the data processing methods shown in FIG. 4A and FIG. 4B. The sensing network system without the central server for storing the sensed data of nodes can retrieve and restore the sensed data of the failed node or the stolen node when any node in the sensing network system fails or is stolen. Also, the download bandwidth usage rate could be increased.

The data processing methods shown in FIG. 4A and FIG. 4B can be implemented by the nodes at the same time or in sequence, and it is not limited herein. That is, the methods shown in FIG. 4A and FIG. 4B can be implemented at the same time or in any order. In Step S401 shown in FIG. 4A, the node starts to sense and obtains the sensed data. After that, in Step S402, the node stores the sensed data in the first storage area of its storage device. In Step S403, the node divides the sensed data into a plurality of data fragments. After that, in Step S404, the node transmits these data fragments to at least one of other nodes.

In Step S411 shown in FIG. 4B, the node receives the data fragments of the sensed data from one of other nodes. In Step S412, the node combines the received data fragments. After that, in Step S413, the node stores the combined data fragments as the sensed data of that other node in the second storage area of its storage device.

It should be noted that the data processing method may further comprise a step (not shown): as a node fails or is stolen, the sensing network system 2 will read the second storage area of the storage device of one or more of other nodes that stores the data sensed by the failed or stolen node so as to retrieve and restore the data sensed by the failed or stolen node. Moreover, in order to increase the fault tolerance of data retrieving, the data processing method may further apply the storage concept called big data mentioned above. Specifically speaking, if the sensed data of the failed or stolen node is separately stored in the second storage areas of the storage devices of more than one of other nodes (that is, the more than one of other nodes respectively store a part of the data fragments of the abovementioned sensed data), the sensing network system 2 would read the data fragments in the second storage areas of the storage devices of those other nodes and combine them to form the abovementioned sensed data.

To sum up, the instant disclosure provides a sensing network system without a central server, a node and a data processing method thereof for storing the data sensed by the nodes. The sensing network system, the node and the data processing method according to the instant disclosure can increase the download bandwidth usage rate, and decrease the establishment cost of the network system. Preferably, the sensing network system, the node and the data processing method may also apply the storage concept called big data for increasing the fault tolerance of data retrieving.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A sensing network system, comprising:
a plurality of nodes, connected with each other, and each node having a sensing device and a storage device;
wherein the storage device of each node is divided into a first storage area and a second storage area, the first storage area stores data sensed by the sensing device of the node, the second storage area stores at least a part of data sensed by the sensing device of at least one of other nodes, and the node transmits at least a part of the data sensed by its sensing device to at least one of other nodes, to store at least a part of the data sensed by its sensing device in the second storage area in the storage device of at least one of other nodes.

2. The sensing network system according to claim 1, wherein the data transmitted between the nodes is a Peer to Peer (P2P) transmission.

3. The sensing network system according to claim 1, wherein the node divides the data sensed by its sensing device into a plurality of data fragments, and transmits at least a part of the data fragments of the data sensed by its sensing device to at least one of other nodes.

4. The sensing network system according to claim 1, wherein the node receives at least a part of a plurality of data fragments of the data sensed by the sensing device of at least one of other nodes.

5. The sensing network system according to claim 1, wherein the number of the nodes is N, and the node transmits at least a part of the data sensed by its sensing device to other M nodes, wherein N is an integer greater than 2 and M is an integer greater than N/2.

6. The sensing network system according to claim 5, wherein as the node fails or is stolen, via reading the second storage areas of the storage devices of at least a part of other L nodes storing the data sensed by the sensing device of the failed or stolen node, the data sensed by the sensing device of the failed or stolen node is obtained, and wherein L is an integer greater than M/2.

7. A node in a sensing network system, comprising:
a sensing device, configured to sense for obtaining data;
a transmission device, configured to receive at least a part of the data sensed by the sensing device of at least one of other nodes;
a storage device, comprising a first storage area and a second storage area, wherein the first storage area of the storage device is configured to store the data sensed by the sensing device of the node, and the second storage area of the storage device is configured to store at least a part of the data sensed by the sensing device of at least one of other nodes; and
a processing device, electrically connected to the sensing device, the transmission device and the storage device;
wherein the transmission device is further configured to transmit at least a part of the data sensed by the sensing device of the node to at least one of other nodes, so as to store at least a part of the data sensed by the sensing device of the node in the second storage area of the storage device of at least one of other nodes.

8. The node according to claim 7, wherein the data transmitted between the nodes is a Peer to Peer (P2P) transmission.

9. The node according to claim 7, wherein the node divides the data sensed by its sensing device into a plurality of data fragments, and transmits at least a part of the data fragments of the data sensed by its sensing device to at least one of other nodes.

10. The node according to claim 7, wherein the node receives at least a part of a plurality of data fragments of the data sensed by the sensing device of at least one of other nodes.

11. The node according to claim 7, wherein the number of the nodes is N, and the node transmits at least a part of the data sensed by its sensing device to other M nodes, wherein N is an integer greater than 2 and M is an integer greater than N/2.

12. The node according to claim 11, wherein as the node fails or is stolen, via reading the second storage areas of the storage devices of at least a part of other L nodes storing the data sensed by the sensing device of the failed or stolen node, the data sensed by the sensing device of the failed or stolen node is obtained, and wherein L is an integer greater than M/2.

13. A data processing method, used in each of a plurality of nodes connected with each other in a sensing network system, wherein each of the nodes has a sensing device and a storage device, and the storage device comprises a first storage area and a second storage area, the data processing method comprising:
   sensing to obtain data via the sensing device of the node;
   storing the data sensed by the sensing device of the node in the first storage area of the storage device of the node;
   receiving at least a part of the data sensed by the sensing device of at least one of other nodes in the sensing network system via the node; and
   storing at least a part of the data sensed by the sensing device of at least one of other nodes in the second storage area of the storage device of the node.

14. The data processing method, according to claim 13, further comprising:
   transmitting at least a part of the data sensed by the sensing device of the node to at least one of other nodes, to store at least a part of the data sensed by the sensing device of the node in the second storage area of the storage of at least one of other nodes.

15. The data processing method, according to claim 13, wherein the number of the nodes is N, and the node transmits at least a part of the data sensed by its sensing device to other M nodes, wherein N is an integer greater than 2 and M is an integer greater than N/2.

16. The data processing method, according to claim 15, wherein as the node fails or is stolen, via reading the second storage areas of the storage devices of at least a part of other L nodes storing the data sensed by the sensing device of the failed or stolen node, the data sensed by the sensing device of the failed or stolen node is obtained, and wherein L is an integer greater than M/2.

* * * * *